Patented Jan. 7, 1947

2,413,799

UNITED STATES PATENT OFFICE 2,413,799

PRODUCTION OF CALCIUM SULFATE

Roy W. Sullivan, Wilmington, Del., assignor to E. I. du Pont de Nemours & Company, Wilmington, Del., a corporation of Delaware No Drawing. Application June 23, 1944, Serial No. 541,844

6 Claims. (Cl. 23—122)

This invention relates to the production of pigment-useful calcium sulfate, and more particularly to novel methods for obtaining calcium sulfate in the form of insoluble anhydrite possessing certain essential consistency-imparting properties when employed in conjunction with a rutile titanium oxide pigment in coating compositions.

The insoluble anhydrite modification of calcium sulfate is characterized by a specific X-ray diffraction pattern and comprises the most adaptable form of calcium sulfate for pigment usage. To be utilizable as a pigment extender, the anhydrite must exhibit certain fineness characteristics whereby at least 75% of its particles possess an average particle size ranging within about .5 to 2 microns with none of its particles exceeding about 5 microns. This anhydrite product may be obtained by dehydrating gypsum in strong sulfuric acid or by gradually adding a concentrated lime solution to about 60° Bé. (78%) sulfuric acid, and continuing the reaction until approximately 85% of the acid becomes neutralized. Particularly useful methods for obtaining anhydrite from sulfuric acid and lime include those disclosed in U. S. Patents 2,046,054 and 2,151,339.

In Patent 2,046,054 a calcium sulfate-extended titanium pigment is obtained by mixing about 30 parts of calcined titanium oxide with about 70 parts of precipitated calcium sulfate, after which the mixture is calcined to provide the desired extended pigment. To control the consistency of coating compositions, such as paints, enamels, lacquers, etc., made up from these pigments, it is customary to vary over a rather wide range the calcination to which the blended pigment mixture is subjected. Insofar as composite anatase $TiO_2$ pigment manufacture is concerned, this method of effecting consistency control is quite satisfactory since, in such instances, a wide range calcination temperature can be resorted to without incurring any substantial impairment in the quality of the final pigment, and hence this method affords production of blended calcium base anatase titanium pigments adapted to provide a variable consistency range when ground into paints with linseed oil or other paint vehicles.

When, however, the $TiO_2$ component of the composite pigment comprises rutile, control over the consistency characteristics of the pigment and the resulting coating composition into which it may be incorporated cannot be satisfactorily effected, for the reason that blends of rutile $TiO_2$ and precipitated anhydrite cannot be calcined to temperatures which are normally employed in composite pigment production because of the pigment discoloration which is encountered. As a consequence, one must resort in such instances to relatively low temperature calcination treatment which means that only high consistency type products can be obtained. The exact cause of the discoloration which accompanies such extended rutile production is not well understood, but it invariably appears when an attempt is made to reduce the consistency of the pigment and the resulting paint by increasing the calcination temperature of the calcium base rutile pigment.

It is among the objects of this invention to overcome the above and other disadvantages in prior calcium sulfate manufacture and to provide novel methods for accomplishing such objects. It is among the particular objects of the invention to provide a novel form of anhydrite calcium sulfate having the desired attribute of imparting certain essential consistency values to coating compositions in which the same may be incorporated, either alone or in conjunction with an extended prime white ($TiO_2$, ZnS, ZnO, etc.) or colored pigment with which it may be blended; to provide an anhydrite pigment extender substance which is eminently suited for blending with a rutile type titanium oxide pigment whereby, on incorporating the composite pigment in various coating vehicles, production will be insured of a coating composition exhibiting essential and desired consistency values; to provide a process adapted to produce a low or thin consistency extended calcium base rutile pigment, without exerting any radical or extensive changes in normal pigment producing operations, and to provide a novel process for controlling the consistency of pigments and paints made therefrom by controlling the particle size of the anhydrite calcium sulfate portion of the pigment by means of a novel method of producing said sulfate. Other objects and advantages of the invention will be apparent from the following detailed description thereof:

These and other objects are attainable in this invention which embodies the discovery that if the reaction by mixing between a soluble calcium compound and sulfuric acid, to precipitate the insoluble anhydrite, is conducted in an interrupted or discontinuous manner, quite unexpectedly one will obtain a novel form of anhydrite product exhibiting essential color, uniformly small particle size, and requisite consistency-imparting characteristics.

The consistency of pigments and paints manufactured therefrom, as used herein, refers to the resistance which such products exhibit towards deformation or flow. Values therefor are readily determined through means of a Stormer viscometer, a device which measures the consistency of a material by the speed of a rotating member immersed in said material. A description of said device, together with an explanation of a method for determining consistency measurements or values, appears at page 221 of Gardner's "Physical and Chemical Examination of Paints, Varnishes, Lacquers, Color," 9th edition, 1939. Such measurements are well-known for paints which comprise suspensions of pigments in an organic vehicle. It has been found that similar measurements for suspensions of calcium sulfate made in accordance with this invention provide results which are indicative of the consistency of paints containing said calcium sulfate. Accordingly, readings are made on the suspension of the precipitated calcium sulfate in its original condition, and this gives figures which are useful in controlling the consistency of the final product.

In its broader aspects, the invention comprises forming insoluble anhydrite calcium sulfate by mixing, over an extended period of time, an aqueous suspension of a calcium compound with relatively strong sulfuric acid and, after not less than 5% nor more than 50% of the total calcium compound has been mixed, interrupting the mixing operation for a short period of time, and thereafter completing said mixing operation.

In a more specific and preferred embodiment, the invention comprises neutralizing in excess of about 85% of the acid present in a commercial product analyzing 75–80% $H_2SO_4$ by adding thereto a lime slurry containing around 10–20% CaO, effecting said addition at a uniform rate equivalent to from .5–3% of the lime per minute of introduction time, and, after the addition of from about 10–25% of the total lime to be added, interrupting said addition for a period of time ranging from about 10–60 minutes, depending upon the pigment or paint consistency desired, and then completing the addition of the remainder of the lime at the same rate which was used prior to interruption of said addition.

In one practical adaptation of the invention, an aqueous lime slurry or suspension of calcium hydroxide is gradually added, at a constant, uniform addition rate of about 1% per minute, to 60° Bé. sulfuric acid in a suitable reaction vessel. The mixing of the lime with the sulfuric acid results in an increase of temperature, due not only to the sulfuric acid becoming heated upon dilution, but mainly by reason of the heat of neutralization. The rise in temperature is rapid at first and the conditions are such that anhydrous calcium sulfate is formed. The temperature rapidly climbs to a maximum which will vary somewhat with the concentration of the reagents and their initial temperature, but will reach approximately 120–130° C. At this point, which usually occurs after addition of about 10–25% of the total amount of lime slurry to be added, complete interruption of lime addition is effected, since at this point it has been found that the most effective and greatest change in consistency will occur when this maximum temperature is selected for the beginning of the interruption period. After a period of from, say, 20–40 minutes has elapsed following such addition interruption, the remaining lime slurry is added to the reaction vessel and at the constant, uniform addition rate which was resorted to prior to said interruption. The resulting anhydrite slurry is then filtered and washed to effect its purification and may be then filter pressed to become ready for blending with the $TiO_2$ pigment or, if desired, may be calcined or otherwise treated prior to such blending. The anhydrite will be found to consist of a product excellent in color and desirably uniformly small in particle size, i. e., will possess a frequency particle size average of about 0.5 micron with at least 90% of the particles being not greater than 1.5 microns, as determined in accordance with the methods described in U. S. Patent 2,046,054.

By reason of its novel method of preparation, the insoluble anhydrite obtained in accordance with this invention will exhibit controlled consistency characteristics and the use of such product in paints or similar coating compositions will afford a useful medium for controlling the consistency characteristics of such vehicles. When blended with titanium oxide or other prime pigments, and especially with rutile $TiO_2$ pigments, subsequent calcination of the composite product can be effected at the desired temperature without incurring the undesired discoloration disadvantage which has characterized prior productions of anhydrite-extended rutile pigments.

To a clearer understanding of the invention, the following specific examples are given, these being merely in illustration but not in limitation of the invention:

EXAMPLE I

Five batches (A, B, C, D and E below) of anhydrite calcium sulfate were made from 60° Baumé sulfuric acid and a slurry of lime containing 24% $Ca(OH)_2$ at 50° C. in large lead-lined plant tanks equipped with heavy agitation to promote rapid mixing. 56,000 lbs. of sulfuric acid were first introduced into each tank, following which the lime slurry was added in each instance at a substantially constant rate of 1% per minute. A total of about 100 minutes was required for introducing the lime, neglecting the time taken for the interruption in addition which was practiced in the instance of four of the batches, in accordance with the invention. The total amount of lime slurry used per batch was 131,000 lbs., to provide an addition rate of 1,310 lbs. per minute. Heat was not applied to the reactant until 75% of the lime had been added, and then injected steam was resorted to for purposes of maintaining a temperature of about 100° C.

The operating conditions of each of the 5 batches were varied slightly, as already noted, in that the addition of the lime slurry was interrupted in the instance of four of the batches (A, B, C and D); also, as shown below in Table I, the amount of lime added before the interruption was progressively increased in the case of batches A to D, with no interruption whatever taking place in the instance of batch E. As shown by said table, the consistency of the five $CaSO_4$ slurry batches ranges in value from 61–100, as determined on the Stormer viscometer. The consistency values of the slurries from batches A to D, inclusive, in which addition interruption was practiced, ranged from 61–75:

*Table I*

| Batch | A | B | C | D | E |
|---|---|---|---|---|---|
| Percent lime before interruption | 11 | 15 | 19 | 23 | ---- |
| Max. temp. degrees | 122 | 122 | 122 | 122 | 125 |
| Minutes interrupted | 30 | 30 | 30 | 30 | ---- |
| Total time for strike | 130 | 130 | 130 | 130 | 100 |
| Consistency-strike slurry | 61 | 63 | 66 | 75 | 100 |

EXAMPLE II

The five calcium sulfate products from batches A, B, C, D and E described in Example I, after conventional filtration and washing, were separately blended with finely-ground rutile titanium dioxide in the ratio of 30 parts $TiO_2$ per 70 parts of calcium sulfate. The blended products were then calcined at a temperature of 600° C. and dry ground to obtain satisfactory fineness. Each was then ground into a representative flat oil type paint and was again tested on the Stormer viscometer for consistency. The consistency values for these five oil type flat paints were determined to be 6, 11, 12, 18 and 24 for the composite pigments containing calcium sulfate from batches A, B, C, D and E, respectively.

The above examples demonstrate the variation in consistency properties of pigments obtainable in this invention and the control and regulation thereof which can be effected by reason hereof. While the slurries of the precipitated calcium sulfate from batches A to D, inclusive, showed consistency values ranging from 61 to 75, as determined on the Stormer viscometer, it is obvious that the invention is not limited to these values.

Again, while a 24% suspension of calcium hydroxide was used in the above examples, obviously the concentration and type of calcium compound can be varied considerably. The limitation of concentration is the maintenance of fluidity of the lime and the fluidity of the resulting calcium sulfate slurry. Concentrations up to, say, 28 or 30% $Ca(OH)_2$ are utilizable, particularly when low consistency calcium sulfate pigment is to be produced by interrupting the strike when only 10 or 20% of the lime has been added. Calcium hydroxide comprises the preferred lime compound and can be obtained by hydrating high calcium burned lime. Other calcium compounds, such as calcium carbonate, which will react with sulfuric acid to give the desired calcium sulfate, can also be used. However, the heat generated by the reaction with calcium carbonate is considerably less and additional difficulties, particularly supplying heat to the batch, will be encountered. Hence, this raw material, though utilizable, is not as preferred for use as is a hydrated lime slurry.

The sulfuric acid employed herein is of the 60° Baumé variety since it is readily available and at low cost. This acid analyzes about 78% sulfuric acid but this concentration is not essential in obtaining the benefits of the invention. As already indicated, it is important to reach a temperature of approximately 120° C. early in the precipitation, and this can be best accomplished by using the concentrated lime slurry and acid containing from about 75% to 80% $H_2SO_4$. The maximum temperatures, when using these reagents and absent external heat, are obtained when about 15% of the lime has been added to the acid. The temperature at this point is approximately the boiling temperature of the acidic suspension and will vary from about 120° C. to 135° C. Further additions of lime result in a lowering of the temperature due to the lowering of the boiling point of the aqueous medium. A further decrease in temperature will occur if the lime slurry is considerably lower in temperature than the material to which it is being added. Usually a lime slurry temperature of about 50° C. can be maintained and the calcium sulfate slurry can be heated by means of injected steam after about 75% of the lime has been added. It is obvious that these figures depend greatly on the temperature of the lime reactant and that the process may be varied considerably. It is usually more desirable to make use of the heat of hydration of the lime which produces a warm suspension of this reagent.

The rate of addition of the lime to the acid is also subject to wide variance. The examples illustrate a rate of addition of 1% per minute and at a uniform or constant rate. This constant rate is also not essential and hence considerable variation with respect thereto is permissible. Preferably the limits of, say, .5 to 3% per minute are observed in the addition since the best pigment-useful anhydrite product results when these rates are utilized. It is sometimes advantageous to admit the calcium hydroxide at a slower rate, say, at a rate of .5 to .75% per minute, during the first 10 to 15 minutes, and then to increase the rate to, say, 1 to 2% per minute after termination of the interruption period. Whether these variations are desirable will depend upon equipment availability, its arrangement, and the temperature conditions, particularly the temperature of the lime being used. Such variations in some instances may improve the properties of the calcium sulfate but their use is not an essential to the procurance of the benefits of the invention.

As stated above, the lime addition interruption should take place only after a temperature of 100° C. is exceeded and a substantial portion of the lime has been added to the sulfuric acid, e. g., when not less than 5% and not to exceed 50% of the total amount to be added has been mixed with said acid. As already indicated, the maximum temperature is reached when about 15% of the lime has been added and interruption at this point has been found to advantageously produce a large reduction in consistency in the anhydrite. The calcium sulfate of batch A in Example I shows the lowest consistency of the group illustrated, and in this instance the maximum temperature was not reached until after the lime addition was resumed. The temperature at time of interruption was about 115° C. and which later advanced to 122° C. when an additional 5% of the lime was added. A temperature in excess of 100° C. is usually obtained by the addition of 10% or more of the lime.

The length of the interruption period is preferably from 20 to 40 minutes, but may vary, if desired, to within, say, the limits of about 10 to 60 minutes. Longer aging or conditioning periods can be resorted to but are unnecessary since they result in no additional advantage and involve a wasteful tie-up of equipment.

As already stated, the calcium sulfate product of this invention is particularly useful for blending with titanium dioxide, to obtain a composite titanium pigment, and especially with titanium dioxide in the rutile crystalline form. The calcium sulfate slurry after filtering, washing to remove the small amount of unneutralized sulfuric acid and blending with finely-divided pigment titanium dioxide, may be calcined or heated to a temperature of 500° C. to 600° C. This heat treatment stabilizes the calcium sulfate and removes any gypsum that it may contain, thereby improving its pigment properties. It is understood, however, that this method of extending titanium pigments is not a necessary part of this invention but is merely alluded to in demonstration of the usefulness of the improved product which this invention provides.

Extended titanium pigments, as made from the above described calcium sulfate, will vary in consistency and this variation parallels the variation in consistency in the original calcium sulfate aqueous suspension. The actual numerical consistency values for the paints containing the extended titanium pigment will be considerably different due to the high viscosity of the oil used but the data obtained for the aqueous suspension of the calcium sulfate precipitate is of great value in determining the influence of the calcium sulfate on the consistency of any paints which may later contain the extender.

I claim as my invention:

1. A process for producing pigment-useful anhydrite calcium sulfate which comprises gradually mixing an aqueous suspension of a calcium compound with relatively strong sulfuric acid, completely interrupting the mixing operation for a short period of time after not less than 5% nor more than 50% of the total calcium compound to be reacted has been mixed with said sulfuric acid, and thereafter continuing the gradual mixing operation until all of said calcium compound has been mixed and reacted with the sulfuric acid reactant.

2. A process for producing pigment-useful anhydrite calcium sulfate which comprises gradually mixing an aqueous suspension of a calcium compound with relatively strong sulfuric acid, completely interrupting the mixing operation for a period ranging from about 10–60 minutes after admixture of from 10–25% of the total calcium compound to be reacted, and thereafter continuing the gradual mixing operation until all of said calcium compound has been mixed and reacted with the sulfuric acid reactant.

3. A process for producing insoluble anhydrite which comprises gradually mixing an aqueous suspension of a calcium compound with relatively strong sulfuric acid, completely interrupting the mixing operation for a period of from 10–60 minutes when the resulting reaction mixture reaches a temperature ranging from about 120–130° C., and thereafter continuing said gradual mixing operation until all of said calcium compound has been mixed and reacted with the sulfuric acid reactant.

4. A process for producing pigment-useful, insoluble anhydrite which comprises adding a lime slurry at a uniform rate to relatively strong sulfuric acid, completely interrupting said addition for a period ranging from 10–60 minutes after not less than 5% nor more than 50% of the total lime slurry to be added has been mixed with said acid, and thereafter continuing the addition at a uniform rate of the remaining portion of said lime slurry until all of said lime slurry has been mixed and reacted with the sulfuric acid reactant.

5. A process for obtaining pigment-useful, insoluble anhydrite which comprises neutralizing sulfuric acid of 75–80% concentration in a reaction vessel by adding thereto at a uniform rate a lime slurry containing from about 10–20% CaO, completely interrupting said lime slurry addition for a period ranging from about 20–40 minutes after a reaction temperature ranging from 120–130° C. has been reached and from about 10–25% of the total lime slurry to be incorporated in said acid has been added thereto, and thereafter completing at a uniform rate the addition of the remainder of said lime slurry to said vessel.

6. A process for obtaining pigment-useful, insoluble anhydrite which comprises gradually adding an aqueous lime slurry containing about 10–20% CaO at a constant, uniform rate of about 1% per minute to a reaction vessel containing 60° Bé. sulfuric acid, completely interrupting said lime slurry addition for a period ranging from about 20–40 minutes after a reaction temperature ranging from 120–130° C. is reached and from about 10–25% of total lime slurry to be added to said acid has been incorporated therein, and thereafter completing the addition of the remainder of the lime slurry to said vessel at the same constant, uniform addition rate resorted to prior to said interruption.

ROY W. SULLIVAN.